(12) United States Patent
Elias et al.

(10) Patent No.: US 7,841,784 B2
(45) Date of Patent: Nov. 30, 2010

(54) DEVICE FOR CONNECTING A CAMERA TO A SUPPORTING DEVICE

(75) Inventors: James Elias, Munich (DE); David Schuster, Munich (DE)

(73) Assignee: Arnold & Richter Cine Technik GmbH & Co. Betriebs KG, Munich (DE)

(*) Notice: Subject to any disclaimer, the term of this patent is extended or adjusted under 35 U.S.C. 154(b) by 281 days.

(21) Appl. No.: 12/039,098

(22) Filed: Feb. 28, 2008

(65) Prior Publication Data

US 2009/0060489 A1 Mar. 5, 2009

(30) Foreign Application Priority Data

Sep. 3, 2007 (DE) .................. 20 2007 012 388 U (51) Int. Cl.
*G03B 17/00* (2006.01)
*F16M 11/04* (2006.01)

(52) U.S. Cl. ................ 396/428; 248/187.1; 348/373; 403/381

(58) Field of Classification Search ........... 396/419, 396/428; 348/373, 376; 403/381; 248/187.1; 108/28; 206/316.2
See application file for complete search history.

(56) References Cited

U.S. PATENT DOCUMENTS 2,615,664 A 10/1952 Reeves
5,230,490 A 7/1993 Sloop
5,547,330 A 8/1996 Walimaa et al.
5,870,641 A 2/1999 Chrosziel
7,077,582 B2 * 7/2006 Johnson .................. 396/428
2009/0220225 A1 * 9/2009 Boneschanscher et al. .. 396/428

FOREIGN PATENT DOCUMENTS

| DE | 90 16 714 | 4/1991 |
| DE | 90 16 714.7 | 4/1991 |
| DE | 298 19 493 U1 | 2/1999 |
| EP | 0 139 452 B1 | 1/1988 |
| WO | WO 2007/002507 A2 | 1/2007 |

OTHER PUBLICATIONS

German Search Report dated Oct. 30, 2008 for application No. 20 2007 012 388.4, 4 pages.

* cited by examiner

*Primary Examiner*—Christopher E Mahoney
*Assistant Examiner*—Autumn Parker
(74) *Attorney, Agent, or Firm*—Christie, Parker & Hale, LLP (57) ABSTRACT

A device for connecting a camera to a supporting device as provided. The device has a locking plate which includes a wedge-shaped recess with a dovetail guide which is insertable into a wedge-shaped plate with another dovetail guide. The wedge-shaped plate is connectible to the camera. The device also has a front clamping mechanism for bracing the wedge-shaped plate in the wedge-shaped recess, and in a rear region, has a rear clamp mechanism with a securing pin for engaging a guide shoe connectible to the camera. The device also includes a setting device for adjusting the front clamping mechanism along a longitudinal axis of the locking plate.

11 Claims, 6 Drawing Sheets

DEVICE FOR CONNECTING A CAMERA TO A SUPPORTING DEVICE

CROSS-REFERENCE TO RELATED APPLICATION

This application claims priority of German Patent Application Number 20 2007 012 388.4, filed on Sep. 3, 2007.

BACKGROUND OF THE INVENTION

The invention relates to a device for connecting a camera to a supporting device.

U.S. Pat. No. 5,870,641 A1 discloses a quick-clamping locking plate for a camera which is positioned on a camera stand and so as to make it possible for a camera to be quickly clamped in, locked and disengaged. The quick-clamping locking plate has, in its front region, a dovetail guide, of which the guide edges approach one another conically in the direction of the front end of the plate and serve for accommodating a complementary insert part which is connected to the camera. The insert part, which is pushed into the dovetail guide, is arrested with the aid of a clamping pin which can be displaced along the centre longitudinal axis of the plate and is connected to a pivotable hand lever via a linkage. A tightening pin which can be adjusted perpendicularly to the plane of the plate is arranged at the rear end of the plate and is connected to the hand lever via an articulated connection. Above the plane of the quick-clamping locking plate, the securing pin has a collar, beneath which engages a retaining strip which is connected to the camera and by means of which the camera is also locked at the rear end of the quick-clamping locking plate.

The transmission of a pivoting movement of the hand lever to the clamping pin, provided in the dovetail guide, and to the rear securing pin, via the articulated connection, takes place via an actuating plate which is arranged parallel to the plane of the locking plate and is fastened on a pin along a centre longitudinal axis of the quick-clamping locking plate, perpendicularly to the plane of the latter. On the opposite sides of the pin, the actuating plate has two driving pins which engage in slots which run perpendicularly to the centre longitudinal axis and are formed in a front and rear pressure plate, which are each guided in a guide groove running along the centre longitudinal axis.

In order to compensate for production tolerances in particular of the insert part, which is connected to the camera, and as a result of thickness tolerances of the rear securing pin, compression springs are provided in the force-transmission path of the pressure plates from the actuating plate, which is connected to the hand lever, to the front clamping pin and to the rear securing pin.

Despite large cross sections and constants of the compression springs, it is impossible to avoid the situation, in the case of the known quick-clamping locking plate, where, as a result of the long lever arm between the quick-clamping locking plate and the opposite, top end of the camera, the camera can execute undesirable movements which result in the photographs being blurred.

Furthermore, locking of the quick-clamping locking plate to the camera requires a high level of manual force to be applied upon adjustment of the front and rear pressure plates.

A further disadvantage of the known locking plate is the provision for just one open position and locking position, in which the camera can be respectively positioned on the locking plate and removed from the locking plate. In the open position, however, the camera is not secured in any way, in which case there is a risk of the camera becoming disconnected from the locking plate if the operator does not hold the camera firmly until it is locked in place. However, this requires a considerable amount of effort if connecting the camera to the locking plate can only be done in a physically awkward position such as with arms stretched out above the head.

SUMMARY OF THE INVENTION

In an exemplary embodiment the present invention specifies a device which is intended for connecting a camera to a carrier element of the type mentioned in the introduction, allows locking and unlocking with only a relatively low level of risk being applied, compensates for production tolerances without adversely affecting a secure and stable connection between the camera and the supporting device, and ensures easy, reliable handling even in the event of the camera or the supporting device being awkwardly positioned.

The solution according to the invention ensures manual locking and unlocking of the locking plate with only a low level of force being applied, allows compensation for production tolerances with a simultaneously secure and stable connection between the camera and the supporting device, and ensures easy, reliable handling for connecting the camera to the supporting device even in the event of the camera or the supporting device being awkwardly positioned.

In the case of the solution according to the invention, the operations of locking and unlocking the locking plate are separate from tolerance compensation, in which case both functions can be optimized in respect of their set aims. The level of force which is necessary for locking and unlocking the locking plate is thus considerably reduced by corresponding lever arms which connect the operating lever to the front and rear clamping mechanisms, and by doing away with compression springs in the force-transmission path from the operating lever to the front and rear clamping mechanisms, these compression springs producing a prestressing force which has to be applied manually. The operation of setting the front clamping mechanism for adaptation to the wedge-shaped plate, which is connected to the camera, separately from the locking and unlocking operations using a separate setting device allows not just precise tolerance compensation, but also tolerance compensation in the case of large tolerances or tolerance deviations. The wedge-shaped plate, which is connected to the camera, can thus be clamped into the mating contour of the recess with dovetail guide of the locking plate ideally and without tolerance compensation by means of a compression spring, in which case instabilities when the camera is being connected to a camera stand, which are caused as a result of a compression spring yielding, are avoided.

A further advantage of the solution according to the invention is that, by virtue of dispensing with spring elements in the force-transmission path from the movement lever to the clamping mechanisms, it is also possible to have intermediate positions of the operating lever between the open position and locking position of the clamping mechanism, these intermediate positions significantly facilitating handling when a camera is being connected to the locking plate and thus to the supporting device.

The setting device preferably contains a spindle or screw-thread adjuster which can be actuated by means of an adjusting screw, arranged at the rear end of the locking plate, and is connected to the front clamping mechanism.

The arrangement of the adjusting screw at the rear end of the locking plate allows easy handling for tolerance compensation, i.e. for clamping the wedge-shaped plate, which is connected to the camera, into the recess of the locking plate, despite the camera being positioned on the locking plate. Connecting the adjusting screw of the setting device to the front clamping mechanism via a spindle or screw-thread adjuster allows for mechanical advantage which allows precise setting with only a low level of manual operating force being applied.

An advantageous configuration of the solution according to the invention consists in that the front clamping mechanism comprises a clamping fork which can be adjusted in the direction of the longitudinal axis of the locking plate, this clamping fork having an ejector pin which is oriented perpendicularly to the locking plate, is arranged on the base of the wedge-shaped recess, in a slot oriented along the longitudinal axis of the locking plate, and engages in a claw of the wedge-shaped plate, which is connected to the camera, and also having two catches which are offset in relation to the ejector pin, project above the base of the recess and are guided in longitudinal slots running parallel to the longitudinal axis of the locking plate.

Dispensing with spring elements in the force-transmission path from the operating lever to the front and rear clamping mechanisms allows, when the operating lever is pivoted parallel to the plane of the locking plate, not just a locking position, in which the wedge-shaped plate, which is connected to the camera, is braced in the recess with dovetail guide and the guide shoe, which is connected to the camera, is braced with the securing pin, and the operating lever preferably butts against the locking plate, and an open position, in which the wedge-shaped plate, which is connected to the camera, and the guide shoe, which is connected to the camera, are unlocked, and the operating lever preferably projects from the locking plate, but also a secured intermediate position, which comes between the open position and the locking position and in which the front clamping mechanism has been displaced in the direction of the locking position to such an extent that the wedge-shaped plate can be inserted into the wedge-shaped recess and can be connected to the wedge-shaped recess in a positive-closing manner without bracing. In the secured intermediate position, the camera, which is connected to the wedge-shaped plate and the guide shoe, can be positioned on the locking plate and secured against removal, but is not yet fixed to the locking plate.

For this purpose, in a preferred embodiment, the ejector pin and the catches are spring-mounted perpendicularly to the surface of the locking plate and the longitudinal axis thereof, in which case the ejector pin and the catches are lowered upon insertion of the wedge-shaped plate, which is connected to the camera, and are released following displacement of the wedge-shaped plate in the direction of the tapering of the dovetail guide.

In this secured intermediate position, the operating lever can be arrested in a positive-closing manner by means of a hook which is arranged on the operating lever, and by means of a pin which is connected to the locking plate.

By virtue of the operating lever being articulated on the locking plate coaxially in relation to the securing pin, and being connected to the clamping fork of the front clamping mechanism via a connecting lever, a space-saving arrangement of the operating lever is ensured and, at the same time, direct actuation of the rear clamping mechanism, without the interposition of any transmission levers or the like, is possible.

The securing pin is preferably actuated in that the securing pin is connected to the operating lever via a threaded drive which, when the operating lever is pivoted, adjusts the securing pin perpendicularly to the surface of the locking plate.

This straight forward mechanical configuration of the rear clamping mechanism ensures that, when the operating lever is opened, the securing pin is driven upwards via the threaded drive and thus releases the guide shoe, which is connected to the camera, whereas, when the operating lever is moved in the opposite direction, the securing pin is drawn downwards, i.e. in the direction of the locking plate, and, in the process, arrests the guide shoe between an end collar of the securing pin and the plane of the locking plate.

In order to compensate for thickness tolerances of the guide shoe, which is connected to the camera, a disc spring is provided, the pronounced compressive force of this disc spring giving rise to a considerably higher compressive force than a compression spring, and this ensures that the guide shoe is clamped in firmly in a play-free manner. Despite the high compressive force of the disc spring, the threaded-drive-induced transmission from the operating lever to the securing pin means that the securing pin can be raised for unlocking purposes, and lowered for locking purposes, with only a low level of operating force being applied.

BRIEF DESCRIPTION OF THE DRAWINGS

The ideas on which the invention is based, as well as further features and advantages of the invention, will be explained in more detail with reference to an exemplary embodiment illustrated in the drawing, in which.

DETAILED DESCRIPTION

Figure 4:
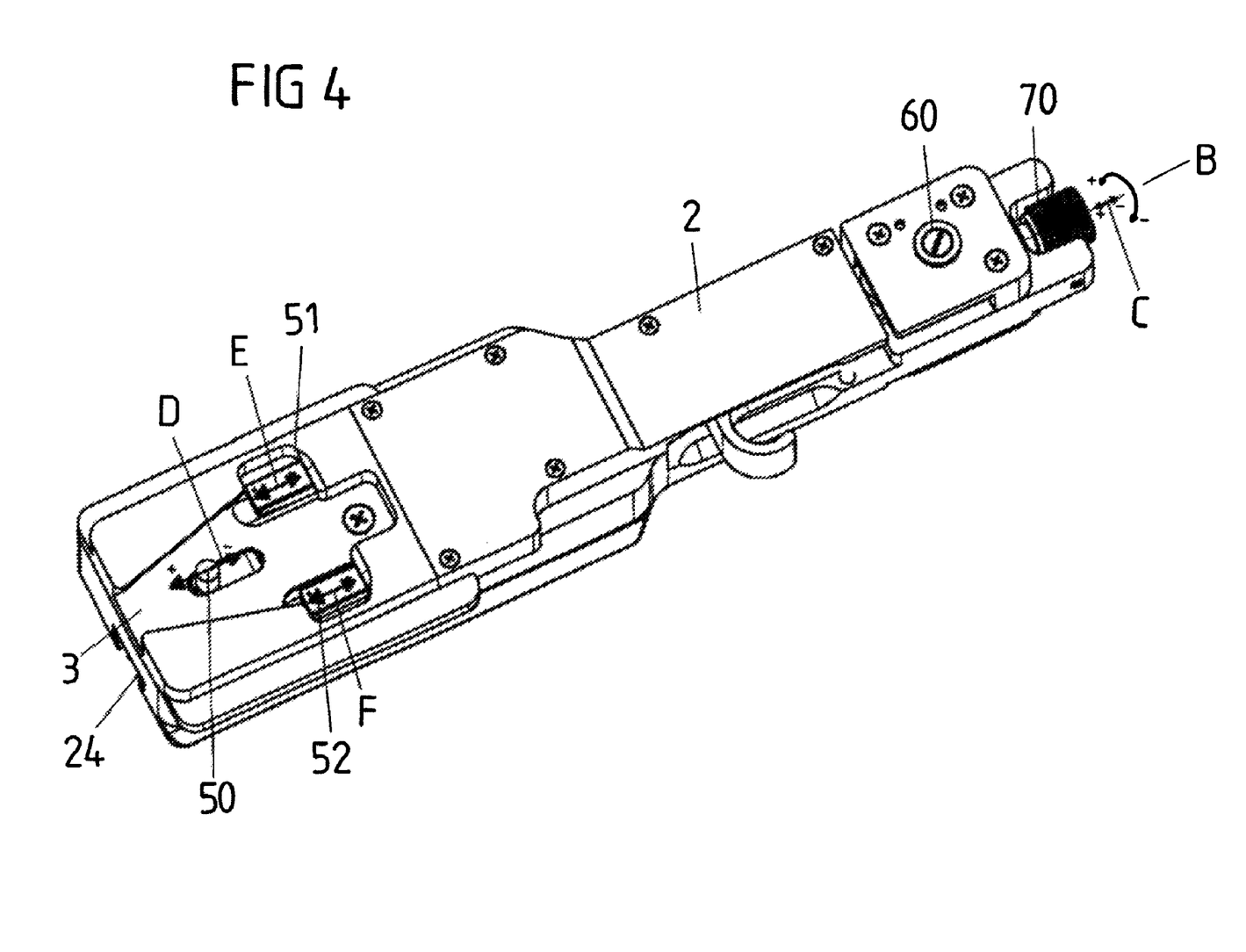
FIG. 4 shows a perspective view of the locking plate to illustrate the tolerance-compensation function by way of adjustment of the front clamping fork.

The locking plate 2 contains a base plate 20 and a cover plate 23 and, according to FIG. 4, has, at the bottom of the base plate 20, a slotted box profile 24 by means of which the locking plate 2 can be plugged onto a corresponding mating profile of a supporting device, for example a camera stand, and can be connected in a positive-closing manner to this supporting device. The design and functioning of the locking plate 2 make is possible for a camera to be quickly and easily positioned on the locking plate 2, clamped into the locking plate 2 and locked to the locking plate 2 and disengaged from the locking plate 2.

In its front region 21, the locking plate 2 has a wedge-shaped recess 3, of which the base 30 is bounded by two guides 31, 32 with inclined walls for forming a dovetail guide, these approaching one another conically in relation to the longitudinal axis A which runs from the front region 21 to the rear region 22 of the locking plate 2. The wedge-shaped recess 3 accommodates a front clamping mechanism 5, which has an ejector pin 50 and two catches 51, 52 running parallel to the longitudinal axis A of the locking plate 2.

Figure 1:
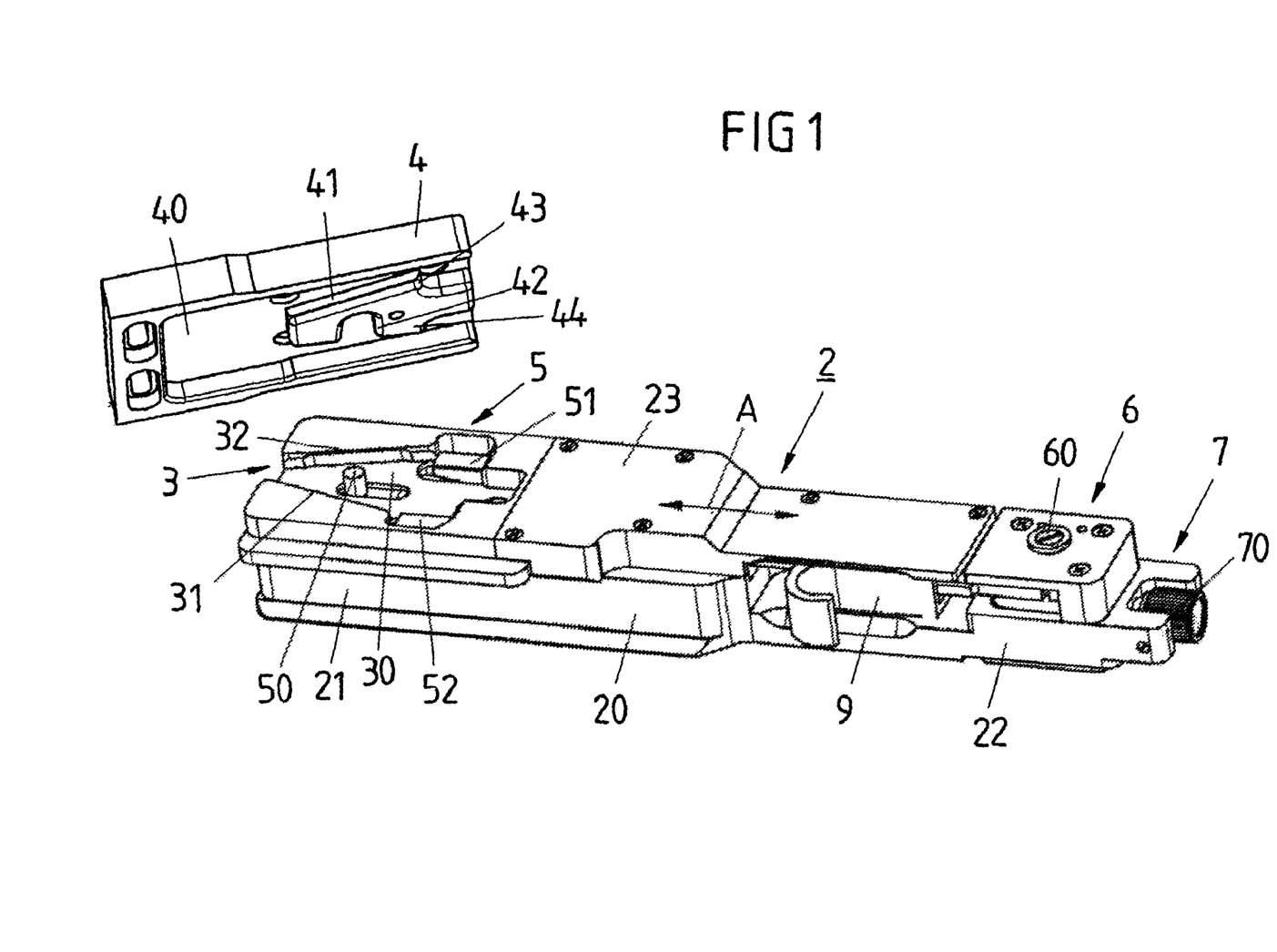
FIG. 1 shows a perspective illustration of the locking plate and of a wedge-shaped plate, which can be connected to a camera.

A wedge-shaped plate 4, which is connected to the base 10 of the camera body (FIG. 2), can be inserted into the wedge-shaped recess 3, and this wedge-shaped plate, according to FIG. 1, contains a wedge 41 which projects from the base 40 of the wedge-shaped plate 4, forms a mating contour in relation to the wedge-shaped recess 3 and has lateral guides which run conically towards one another, in which case, when the wedge-shaped plate 4 is inserted into the wedge-shaped recess 3 of the locking plate 2 and is displaced in the direction of the front end of the locking plate 2, a fixed, positive-closing connection is produced between the wedge-shaped plate 4 and the locking plate 2. When the wedge-shaped plate 4 is inserted into the wedge-shaped recess 3 of the locking plate 2, the ejector pin 50 of the front clamping mechanism 5 engages in a claw 42, which is provided in the wedge 41 and is open in relation to one of the two lateral guides, while the catches 51, 52 of the front clamping mechanism 5 rest against shoulders 43, 44 of the wedge 41 and, for clamping the camera into the locking plate 2 and locking it to the same, press against the shoulders 43, 44 and thus produce the positive-closing connection between the wedge-shaped plate 4 and the wedge-shaped recess 3 of the locking plate 2.

Figure 2:
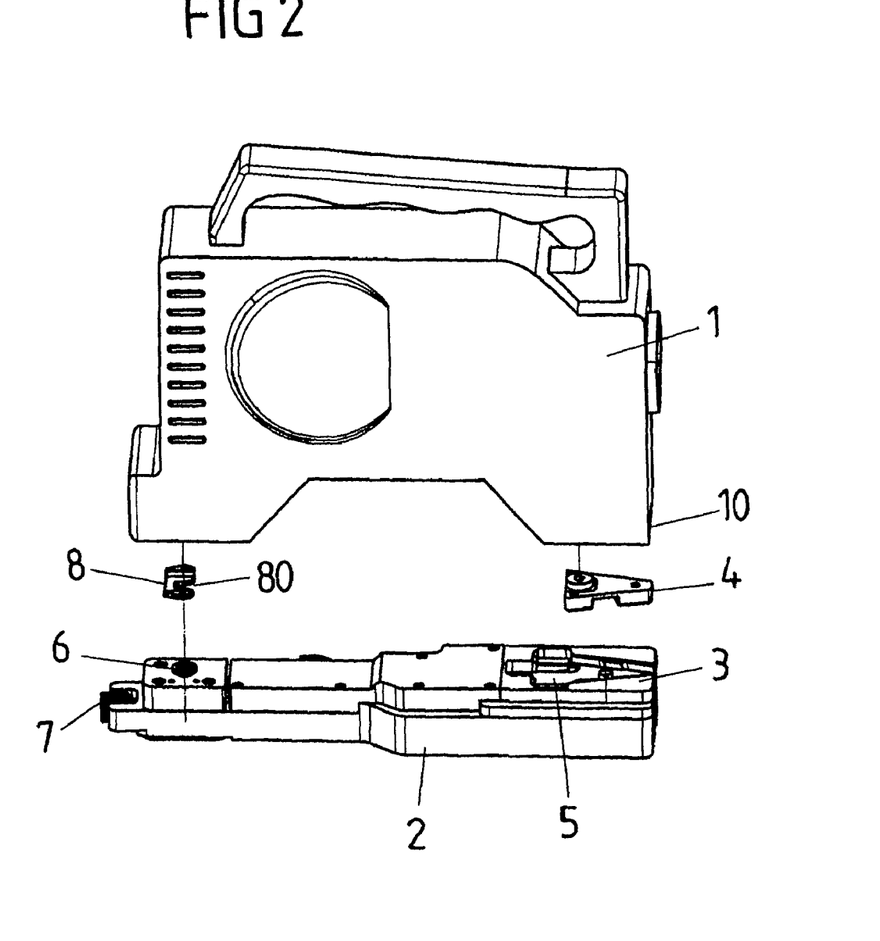
FIG. 2 shows a perspective illustration of a camera which can be connected to the locking plate according to FIG. 1 via a wedge-shaped plate and a guide shoe.

Provided at the rear end 22 of the locking plate 2 is a rear clamping mechanism 6, which contains an securing pin 60 which can be adjusted perpendicularly to the plane of the locking plate 2, accommodates a rear guide shoe 8, illustrated in FIG. 2 and fixed to the base 10 of the body of the camera 1, and connects this guide shoe to the locking plate 2 in a positive-closing and force-fitting manner.

FIG. 2 shows an exploded illustration, in perspective, of a camera 1 with the front wedge-shaped plate 4 and the rear guide shoe 8, which can be fixed to the base 10 of the camera body and, for connecting the camera to the locking plate 2, can be clamped into the locking plate 2 by means of the front and rear clamping mechanisms 5 and 6, respectively, or, following disengagement of the clamping-in mechanism, can be removed from the locking plate 2.

Figure 3:
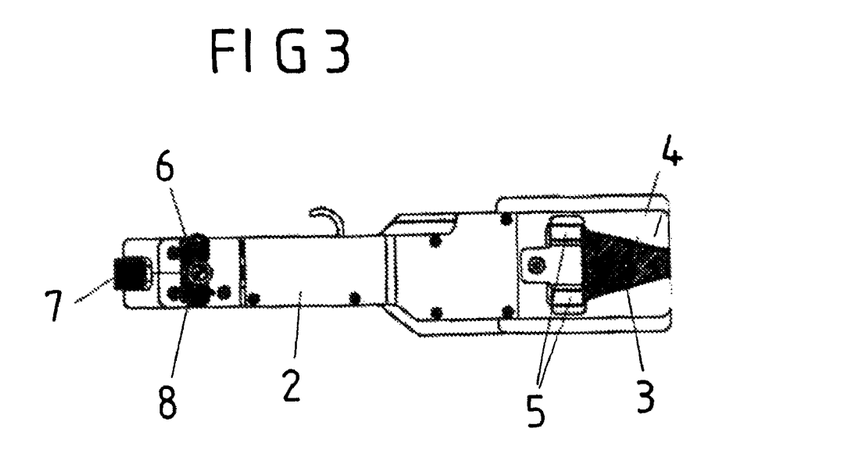
FIG. 3 shows a plan view of the locking plate with the wedge-shaped plate and guide shoe inserted.

FIG. 3 shows, in a section through the clamping elements 4, 8 connected to the base 10 of the camera body, the wedge-shaped plate 4 braced with the wedge-shaped recess 3 of the locking plate 2 by means of the front clamping mechanism 5 and the rear guide shoe 8 locked to the securing pin 60 by means of the rear clamping mechanism 6.

Figure 5:
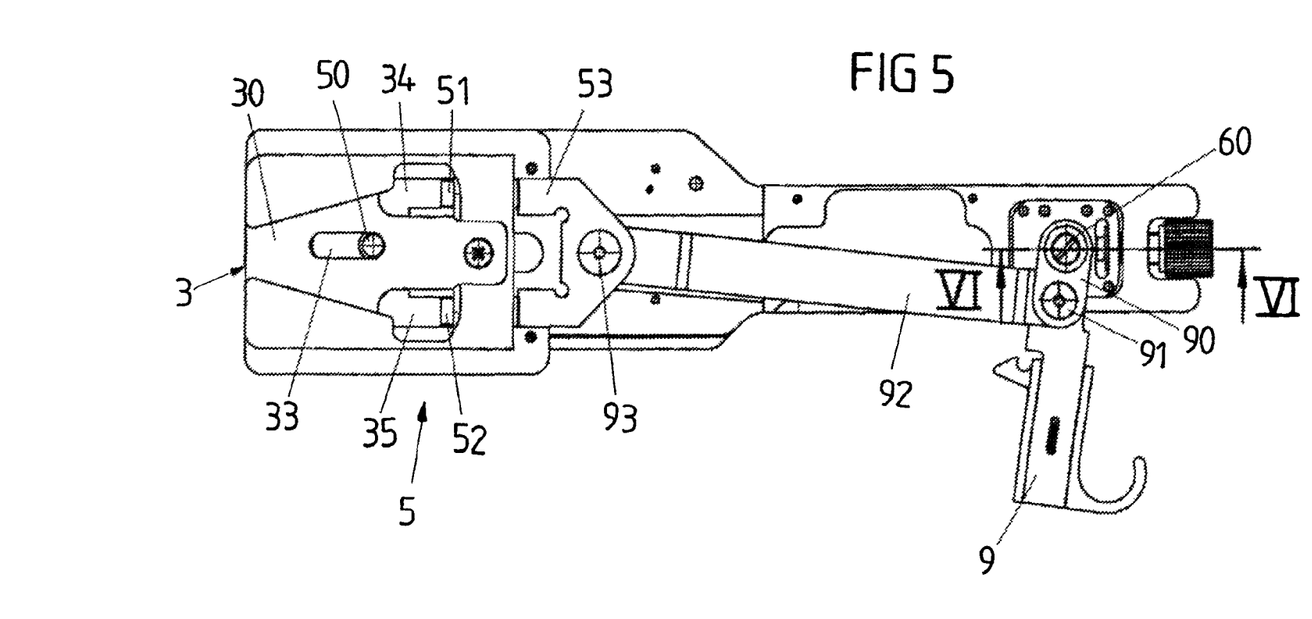
FIG. 5 shows a plan view of the locking plate in the unlocked state.

Provided for locking the camera 1 to the locking plate 2, and unlocking it therefrom, is an operating lever 9 which actuates both the front clamping mechanism 5 and the rear clamping mechanism 6 and is illustrated in FIG. 1 in a locking position, in which it butts flush against a side surface of the locking plate 2, whereas in the unlocking position, which is illustrated in FIG. 5, it projects approximately perpendicularly from the side surface of the locking plate 2.

FIGS. 5 to 10 illustrate the connection between the operating lever 9 and the front clamping mechanism 5 and the rear clamping mechanism 6 in an open position (FIGS. 5 and 6), in a locking position (FIGS. 7 and 8) and in a secured intermediate position (FIGS. 9 and 10) for the purpose of explaining the functions of a camera being locked to the locking plate 2, unlocked therefrom and secured thereto.

The operating lever 9 is connected, via a link plate 90, to the intersecting pin 60, which, at its top end, has a collar 61 for accommodating the rear guide shoe 8, which is connected to the camera, engages in a mouth-like opening 80 in the rear guide shoe 8. In accordance with the section which is illustrated in FIG. 6 and is taken through the rear region 22 of the locking plate 2 along line VI-VI according to FIG. 5, the intersecting pin 60 is adjusted perpendicularly to the plane of the locking plate 2 by means of a threaded drive 62 which is connected to the operating lever 9 into a movement of the securing pin is adjusted perpendicularly to the plane of the locking plate 2 by means of a threaded drive 62 which is connected to the operating lever 9 and converts pivoting of the operating lever 9 into a movement of the securing pin 60 which runs perpendicularly to the plane of the locking plate 2.

Figure 6:
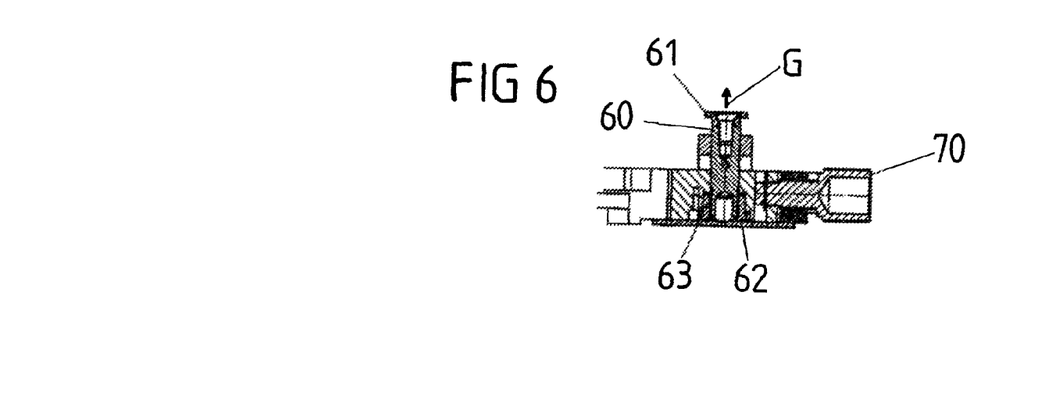
FIG. 6 shows a section through the rear region of the locking plate along section line VI-VI according to FIG. 5.

When the operating lever is opened into the open position, which is illustrated in FIG. 5, the securing pin 60 is driven in the direction of the arrow G, depicted in FIG. 6, and the guide shoe 8, which is connected to the camera 1, is thus released.

The operating lever 9 is connected, via a rotary articulation 91, to a connecting lever 92 which extends, between the base plate 20 and the cover 23 of the locking plate 2, to the front region 21 of the locking plate 2 and is connected there, via a rotary articulation 93, to a clamping fork 53 of the front clamping mechanism 5. The clamping fork 53 is connected both to the ejector pin 50, which is guided in a slot 33 in the base 30 of the wedge-shaped recess 3, and the catches 51, 52, which are guided in guide slots 34, 35 in the base 30 of the wedge-shaped recess 3.

In order to compensate for thickness tolerances of the rear guide shoe 8, which is connected to the camera 1, the securing pin 60 is supported on the base plate 20 of the locking plate 2 by means of disc springs 63, selecting disc springs 63 as the tolerance-compensation elements giving the advantage of a spring force which is much higher than that of compression springs. In order, nevertheless, to ensure easy operation of the rear clamping mechanism 6, the latter is designed as a means of transmission from the operating lever 9 to a threaded drive 62, in which case the long lever arm of the operating lever 9 ensures easy raising and lowering of the securing pin 60.

In the open position, which is illustrated in FIGS. 5 and 6, the camera 1 can be positioned on the locking plate 2 by way of the clamping elements fastened on its base 10, in other words the wedge-shaped plate 4 and the rear guide shoe 8, and it can also be removed from the locking plate 2 in this open position.

Figure 7:
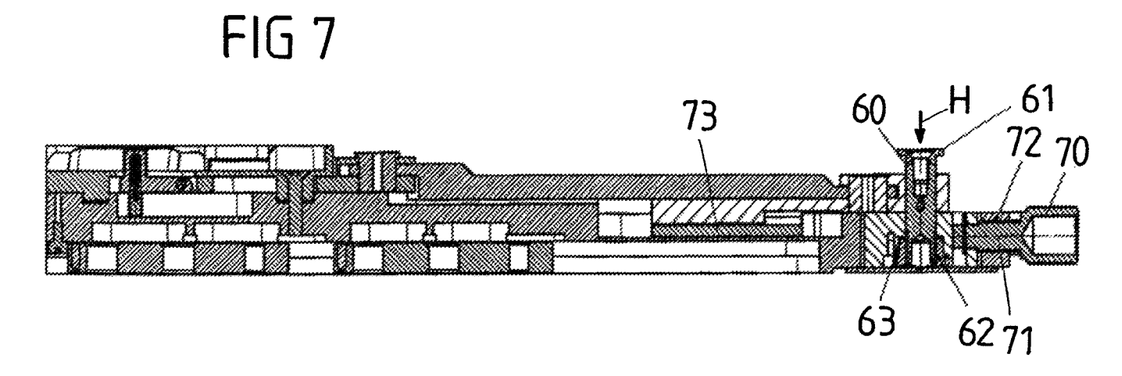
FIGS. 7 and 8 show a longitudinal section through, and a plan view of, the locking plate in the locked state.
Figure 8:
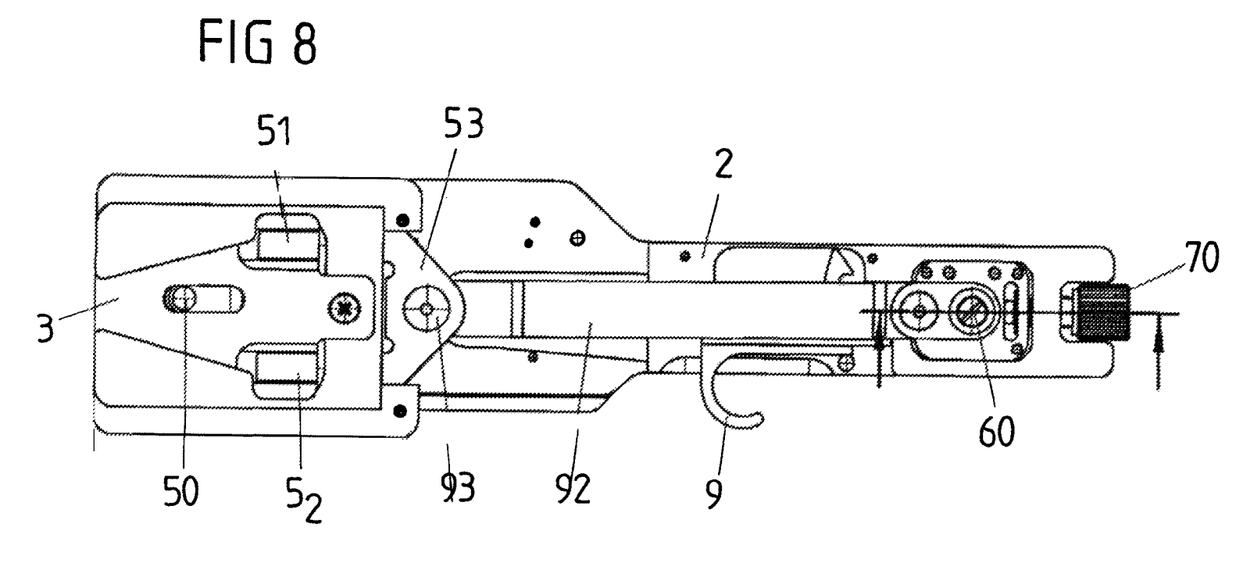

FIGS. 7 and 8 illustrate, in a longitudinal section and a plan view respectively, the locking position, in which the operating lever 9 butts flush against the side surface of the locking plate 2. The front clamping mechanism 5 is located in its foremost position, in which the catches 51, 52, which press against the shoulders 43, 44 of the wedge 41, has moved the wedge 41, and thus the wedge-shaped plate 4, into a fixed, positive-closing connection with the wedge-shaped recess 3, the ejector pin 50 likewise being located in its foremost position within the slot 33 in the base 30 of the wedge-shaped recess 3.

As the operating lever 9 is pivoted out of the open position, which is illustrated in FIG. 5, into the locking position, which is illustrated in FIG. 8, the securing pin 60 is drawn downwards, by means of the threaded drive 62, in the direction of the arrow H according to FIG. 7, i.e. in the direction of the plane of the locking plate 2, in which case the rear guide shoe 8, which is connected to the camera 1, is clamped in firmly between the surface or plane of the locking plate 2 and the collar 61 of the securing pin 60.

A setting device 7 is provided in order to compensate for production tolerances or dimensional deviations between the wedge-shaped plate 4 and the wedge-shaped recess 3 of the locking plate 2, this setting device containing an adjusting screw 70 which is arranged at the rear end of the locking plate 2, in a U-shaped cutout of the base plate 20. By virtue of the adjusting screw 70 being rotated in one direction or the other, the front clamping mechanism 5 with the ejector pin 50 and the catches 51, 52 is moved along the longitudinal axis A of the locking plate 2 in one direction or the other, in which case it is possible to eliminate any play between the wedge 41 of the wedge-shaped plate 4 and the guides 31, 32 of the wedge-shaped recess 3.

The construction and functioning of the setting device 7 will be explained in more detail with reference to the longitudinal section through the locking plate 2 which is illustrated in FIG. 7.

The adjusting screw 70 has a threaded shank 71 with an external thread which engages in an internal thread 72 at the rear end of the base plate 20 of the locking plate 2, in which case rotation of the adjusting screw 70 results in the screw shank 71 being displaced in the direction of the longitudinal axis A of the locking plate 2 (FIG. 1). This longitudinal displacement is transmitted, via a connecting lever 73, to a clamping fork 53 of the front clamping mechanism 5 and results in the ejector pin 50 and the catches 51, 52, which are connected to the clamping fork 53, being displaced in the direction of the longitudinal axis A of the locking plate 2.

FIG. 4 uses a perspective illustration of the locking plate 2 to show the functioning of the setting device 7 by means of double arrows, which have been applied to the adjusting screw 70, the ejector pin 50 and the catches 51, 52. By virtue of the adjusting screw 70 being rotated in one direction of rotation or the other (+−) of the double arrow B, once the wedge-shaped plate 4, which is connected to the camera 1, has been inserted into the wedge-shaped recess 3 of the locking plate 2 and the rear guide shoe 8, which is connected to the camera, has been connected to the securing pin 60, the adjusting device 7 is displaced in the direction of the double arrow C and results in displacement of the front clamping mechanism 5, i.e. of the ejector pin 50 in the direction of the double arrow D and of the catches 51, 52 in the direction of the double arrows E and F. This displacement makes it possible for the wedge-shaped plate 4, which is connected to the camera 1, to be clamped into the mating contour of the wedge-shaped recess 3 of the locking plate 2 in optimum fashion and without any need for tolerance compensation by means of a compression spring. This eliminates the instability which is brought about by tolerance compensation by means of compression springs as a result of the compression spring yielding.

Figure 9:
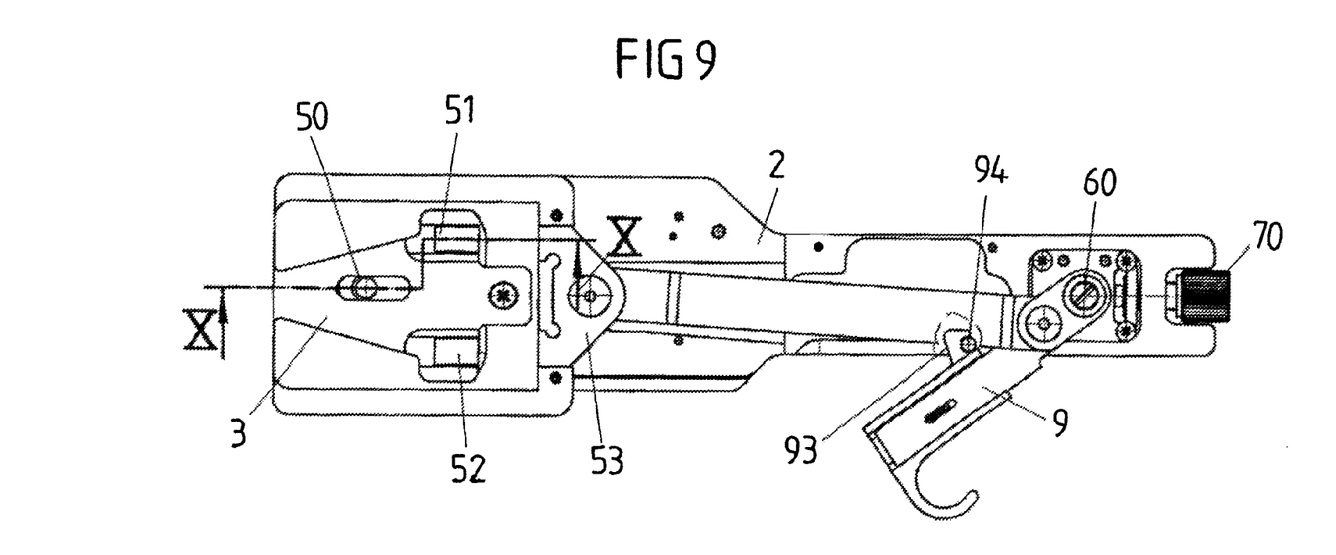
FIG. 9 shows a plan view of the locking plate in a secured intermediate position.
Figure 10:
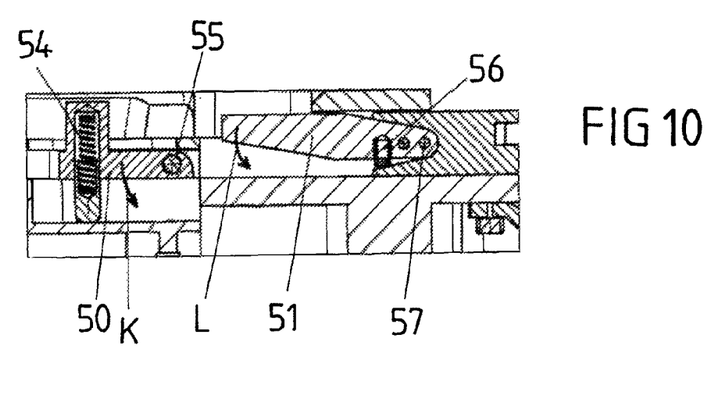
FIG. 10 shows a section through the operating plate along line X-X according to FIG. 9 in the secured intermediate position of the locking plate.

FIGS. 9 and 10 illustrate, in a plan view and a section along line X-X according to FIG. 9, a secured intermediate position of the front clamping mechanism 5 and rear clamping mechanism 6, this position eliminating the disadvantage of known locking plates in which provision is made for just one open position and locking position, in which case the camera 1 can only be positioned on the locking plate 2, and removed from the locking plate 2, in the open position. In this open position, however, the camera 1 is not secured in any way, in which case there is a risk of the camera 1 becoming disconnected from the locking plate 2 and thus being destroyed.

In order to overcome this risk, the locking plate according to the invention has three positions for the operating lever 9 and the front and rear clamping mechanism 5, 6, namely the open position and locking position and the secured intermediate position, which is explained in more detail with reference to the plan view of the locking plate 2 which is illustrated in FIG. 9.

In the secured intermediate position, pivoting of the operating lever 9 from the open position according to FIG. 5 into the locking position according to FIG. 7 has displaced the clamping fork 53 in the direction of the front end of the locking plate 2 to such an extent that the wedge 41, which is inserted into the wedge-shaped recess 3 and forms part of the wedge-shaped plate 4, which is connected to the camera 1, is not yet clamped into the wedge-shaped recess 3, but cannot drop out either.

In order to make it possible, in this secured intermediate position, for the camera to be inserted into the connecting plate 2, spring biasing is provided for the ejector pin 50 and the catches 51, 52, and this prestressing allows the wedge-shaped plate 4 to be inserted into the wedge-shaped recess 3, but prevents removal. The camera 1 can only be removed from the locking plate 2 again once the operating lever 9 has been pivoted into the open position, which is illustrated in FIG. 5.

The secured intermediate position significantly increases the operational reliability, in particular in situations in which handling of the camera is problematic, for example if the locking plate 2, connected to a camera stand, is at a height which requires the cameraman to stretch out his arms in order to insert the camera 1 into the locking plate 2. By setting the secured intermediate position, in which a hook 93 connected to the operating lever 9 latches in a positive-closing manner into a pin 94 connected to the locking plate 2, the wedge-shaped plate 4, which is connected to the camera 1, can be inserted into the wedge-shaped recess 3 and, as a result of one-way bracing with the locking plate 2, can be secured in this position to the extent where it cannot become disconnected from the wedge-shaped recess 3. The cameraman can then let go of the camera 1 in order to actuate the clamping mechanism of the locking plate 2 by pivoting the operating lever 9 further into the locking position, which is illustrated in FIG. 7.

The abovedescribed irreversible bracing of the wedge-shaped plate 4, which is connected to the camera 1, with the wedge-shaped recess 3 of the locking plate 2 is explained hereinbelow with reference to the sectional illustration according to FIG. 10.

FIG. 10 shows, in a section through the ejector pin 50 and the one catch 51 of the two catches 51, 52 of the front clamping mechanism 5, spring support of the ejector pin 50, which can be pivoted about an articulation 55 in the direction of the arrow K, by means of a spring 54 and of the catch 51, which is biased about an articulation 57 by means of a spring 56 and pivots about the articulation 57 in the direction of the arrow L when the wedge-shaped plate 4, which is connected to the camera, is positioned on the locking plate 2.

When the camera 1 is positioned on the locking plate 2, the spring-mounted ejector pin 50 and the spring-mounted catches 51, 52 are thus forced downwards in the direction of the arrows K and L. If the camera 1 is then pushed forwards, the ejector pin 50 and the catches 51, 52 are released upwards, in which case the wedge-shaped plate 4, and thus the camera 1, is retained in a positive-closing manner in the wedge-shaped recess 3 of the locking plate 2.

For full locking between the wedge-shaped plate 4 and the wedge-shaped recess 3 of the locking plate 2, the operating lever 9 is pivoted from the secured intermediate position, which is illustrated in FIG. 9, into the locking position, which is illustrated in FIG. 7 and in which full locking is achieved between the front and the rear clamping mechanisms 5 and 6 and, respectively, the wedge-shaped plate 4 and the rear guide shoe 8, which are connected to the camera body.

If, in contrast, it is desired to remove the camera 1 from the locking plate 2 starting from the secured intermediate position, which is illustrated in FIG. 9, then the operating lever 9 can be pivoted from the secured intermediate position, which is illustrated in FIG. 9, into the open position, which is illustrated in FIG. 5 and in which the clamping fork 53 of the front clamping mechanism 5 and thus both the ejector pin 50 and the catches 51, 52 are drawn back and release the wedge-shaped plate 4 from the positive-closing connection with the wedge-shaped recess 3.

LIST OF DESIGNATIONS

1 Camera
2 Locking plate
3 Wedge-shaped recess
4 Wedge-shaped plate
5 Front clamping mechanism
6 Rear clamping mechanism
7 Setting device
8 Guide shoe
9 Operating lever
10 Base of the camera body
20 Base plate
21 Front region of the locking plate
22 Rear region of the locking plate
23 Cover plate
24 Slotted box profile
30 Base of the wedge-shaped recess
31, 32 Guides
33 Slot
34, 35 Guide slots
40 Base of the wedge-shaped plate
41 Wedge
42 Claw
43, 44 Shoulders
50 Ejector pin
51, 52 Catches
53 Clamping fork
54, 56 Springs
55, 57 Articulations
60 Securing pin
61 Collar
62 Threaded drive
63 Cup springs
70 Adjusting screw
71 Threaded shank
72 Internal thread
80 Mouth-like opening
90 Link plate
91 Rotary articulation
92 Connecting lever
93 Hook
94 Pin
A Longitudinal axis

The invention claimed is:

1. A device for connecting a camera to a supporting device, the device comprising:
   a locking plate which, in a front region, has a wedge-shaped recess with a dovetail guide, into which can be inserted a wedge-shaped plate with another dovetail guide, the wedge-shaped plate being connectible to the camera and designed as a mating contour,
   a front clamping mechanism for bracing the wedge-shaped plate in the wedge-shaped recess said front clamping mechanism comprising a clamping fork which can be adjusted in a direction of a longitudinal axis of the locking plate, and an ejector pin and two latches,
   said ejector pin being oriented perpendicularly to said locking plate, said ejector pin being arranged on a base of the wedge-shaped recess in a slot which is oriented along the longitudinal axis of the locking plate, and said ejector pin further engaging in a claw of said wedge-shaped plate,
   said latches being offset in relation to said ejector pin, said latches projecting above the base of the wedge-shaped recess, and said latches being guided in longitudinal slots running parallel to the longitudinal axis of the locking plate,
   a rear clamping mechanism in a rear region with a securing pin which can be adjusted perpendicularly to a plane of the locking plate for engaging a guide shoe connectible to the camera,
   an operating lever which is articulated in a pivotable manner on the locking plate and actuates the front and rear clamping mechanisms for locking and unlocking the camera, and
   a setting device for adjusting the front clamping mechanism along a longitudinal axis of the locking plate, the front and rear regions of the locking plate being connectible along the longitudinal axis.

2. The device according to claim 1, wherein the setting device comprises a spindle or screw-thread adjuster which can be actuated by means of an adjusting screw, which is arranged at the rear end of the locking plate, and is connected to the front clamping mechanism.

3. The device according to claim 1, wherein when in a locking position, the wedge-shaped plate which is connectible to the camera is braced in the wedge-shaped recess with the dovetail guide wherein the guide shoe, which is connectible to the camera is braced with the securing pin and wherein when in an open position, the wedge-shaped plate which is connectible to the camera, and the guide shoe, which is connectible to the camera, are unlocked.

4. The device according to claim 3, wherein the operating lever is pivotable, parallel to the plane of the locking plate, between the locking position in which the operating lever abuts against the locking plate and the open position, in which the operating lever projects from the locking plate.

5. The device according to claim 3, having a secured intermediate position, in which the front clamping mechanism is displaced in the direction of the locking position to such an extent that the wedge-shaped plate can be inserted into the wedge-shaped recess and can be connected to the wedge-shaped recess in a positive-closing manner without bracing.

6. The device according to claim 5, wherein the ejector pin and the catches are spring-mounted perpendicularly to the plane of the locking plate and the longitudinal axis thereof, and wherein the ejector pin and the catches are lowered upon insertion of the wedge-shaped plate which is connectible to the camera, and are released following displacement of the wedge-shaped plate in the direction of a tapering of the dovetail guide of the wedge-shaped recess.

7. The device according to claim 5, wherein the operating lever can be arrested in the secured intermediate position, in which the camera connectible to the wedge-shaped plate and the guide shoe, can be positioned on the locking plate and secured against removal, without being fixed to the locking plate.

8. The device according to claim 7, wherein a hook is arranged on the operating lever, and wherein a pin is connected to the locking plate for arresting the operating lever in a positive-closing manner in the secured intermediate position.

9. The device according to claim 1, wherein the operating lever is articulated on the locking plate coaxially in relation to the securing pin and is connected to a clamping fork via a connecting lever.

10. The device according to claim 1, wherein the securing pin is connected to the operating lever via a threaded drive and can be adjusted perpendicularly to the plane of the locking plate when the operating lever is pivoted.

11. The device according to claim 1, wherein the securing pin is spring-mounted by means of disc springs.

* * * * *